United States Patent
Kim et al.

(10) Patent No.: US 11,662,203 B2
(45) Date of Patent: May 30, 2023

(54) THREE-DIMENSIONAL SLOPE DETECTION DEVICE AND SLOPE DETECTION METHOD THEREOF

(71) Applicants: Tae-Hee Kim, Dangjin-si (KR); Ji-Chul Ha, Dangjin-si (KR)

(72) Inventors: Tae-Hee Kim, Dangjin-si (KR); Ji-Chul Ha, Dangjin-si (KR)

( * ) Notice: Subject to any disclaimer, the term of this patent is extended or adjusted under 35 U.S.C. 154(b) by 97 days.

(21) Appl. No.: 16/627,172

(22) PCT Filed: Jul. 5, 2018

(86) PCT No.: PCT/KR2018/007662
§ 371 (c)(1),
(2) Date: Dec. 27, 2019

(87) PCT Pub. No.: WO2020/009256
PCT Pub. Date: Jan. 9, 2020

(65) Prior Publication Data
US 2021/0404809 A1    Dec. 30, 2021

(51) Int. Cl.
*G01C 17/34* (2006.01)
*G01C 9/06* (2006.01)
*G01S 3/784* (2006.01)

(52) U.S. Cl.
CPC ............. *G01C 17/34* (2013.01); *G01C 9/06* (2013.01); *G01S 3/784* (2013.01); *G01C 2009/066* (2013.01)

(58) Field of Classification Search
CPC .... G01C 17/34; G01C 9/06; G01C 2009/066; G01S 3/784; G01S 19/10; G01S 19/25; G01S 19/53
See application file for complete search history.

(56) References Cited

U.S. PATENT DOCUMENTS

| 2014/0022539 A1* | 1/2014 | France | G01S 17/06 |
| | | | 701/1 |
| 2015/0260513 A1* | 9/2015 | Bi | G01P 15/00 |
| | | | 702/151 |

FOREIGN PATENT DOCUMENTS

| JP | 2012088073 A * | 5/2012 |
| JP | 2016-502773 | 1/2016 |

(Continued)

OTHER PUBLICATIONS

International Search Report for International Application No. PCT/KR2018/007662, dated Mar. 27, 2019.

(Continued)

*Primary Examiner* — Jennifer D Bennett
(74) *Attorney, Agent, or Firm* — Kile Park Reed & Houtteman PLLC

(57) ABSTRACT

A slope detection device includes a structure provided with a spherical surface, multiple optical sensors provided on a spherical surface of the structure in a manner that face different directions, the optical sensors measuring a quantity of sunlight, an optical sensor receiving unit receiving output information of each of the optical sensors, a time providing unit providing calendar information on a date and a time when the output information is received, and an operation unit configured to analysis an incidence angle of the sunlight from the collected pieces of the output information, calculate a horizontal coordinate system from the analyzed incidence angle of the sunlight, the calendar information, and a sun path equation, and calculate a three-dimensional slope information for a current location in comparison with the horizontal coordinate system.

4 Claims, 17 Drawing Sheets

(56) References Cited

FOREIGN PATENT DOCUMENTS

| | | | |
|---|---|---|---|
| KR | 10-2005-0064651 | | 6/2005 |
| KR | 20050064651 A | * | 6/2005 |
| KR | 10-2010-0010233 | | 2/2010 |
| KR | 20100010233 A | * | 2/2010 |
| KR | 10-2013-0046764 | | 5/2013 |
| KR | 10-2016-0144584 | | 12/2016 |
| KR | 10-1885069 | | 8/2018 |

OTHER PUBLICATIONS

Written Opinion, with English translation, for International Application No. PCT/KR2018/007662, dated Mar. 27, 2019.

* cited by examiner (a)

(b)

(a)

(b)

(a)

(b)

(a)

(b)

(a)

(b)

(a)

(b)          (c)

THREE-DIMENSIONAL SLOPE DETECTION DEVICE AND SLOPE DETECTION METHOD THEREOF

TECHNICAL FIELD

The present invention relates generally to detection of a slope of an apparatus in a three-dimensional space and, more particularly, to a detection device for using the azimuth and the altitude of the sun and a method of detecting a three-dimensional slope of an installed antenna, or the like.

BACKGROUND ART

Base station antennas for mobile communication are densely installed to enable efficient communication within a targeted area. These antennas are directional and directions (azimuths) that the antennas face designed in advance in such a manner as to cover an intended area. Further, it is required that the antenna is installed high using a pillar, or the like, and is placed at an angle (tilt) towards the ground. For example, multiple antennas are installed radially around a pillar standing on a high mountain, and each of the antennas is properly tilted according to areas that antennas placed on other pillars cover, thereby providing a communication service for an area which needs to be covered in accordance with design.

In order to install the antennas according to the azimuths and the tilts of the antennas designed with this intention, an angle measurement device separately designed or various auxiliary measurement methods have been used.

Knowing the azimuth and the tilt of an already installed antenna is very important in maintenance of the antenna. For various reasons such as angle misalignment in initial installation, aging of a pillar facility supporting the antenna, continuous exposure to an external environment, for example, a typhoon, and the like, the angle of the antenna may deviate from its initial angle, which may lead to quality degradation of a communication service in a particular zone. In order to reconfirm the installation angle of the antenna, an operation has to access the antenna with a separate angle measurement device, or the like. Usually, the antenna is installed at a high position, so accessing the antenna is dangerous, difficult, and inefficient.

Considering this, a device that is directly installed on an antenna and measures the angle of the antenna has been developed. However, such conventional technology has to be provided with various measurement modules such as an electronic compass module, a motion recognition sensor, a tilt sensor, and the like, and thus it is bound to be expensive. The measurement device is required for each antenna, so that high cost of the measurement device is a big obstacle to general use.

DISCLOSURE

Technical Problem

The present invention is intended to acquire a three-dimensional slope angle of apparatus such as an antenna, or the like by using sunlight so that whether a current direction that the apparatus faces fits the initially designed intention is immediately identified, thereby enhancing convenience of maintenance of the apparatus.

Other detailed objectives of the present invention will be obviously understood by experts or researchers in the art through the detailed description described below.

Technical Solution

In order to achieve the above objectives, according to an embodiment of the present invention, there is provided a slope detection device including: a structure provided with a spherical surface; multiple optical sensors provided on a spherical surface of the structure in a manner that face different directions, the optical sensors measuring a quantity of sunlight; an optical sensor receiving unit receiving output information of each of the optical sensors; a time providing unit providing calendar information on a date and a time when the output information is received; and an operation unit configured to analysis an incidence angle of the sunlight from the collected pieces of the output information, calculate a horizontal coordinate system from the analyzed incidence angle of the sunlight, the calendar information, and a sun path equation, and calculate three-dimensional slope information for a current location in comparison with the horizontal coordinate system.

According to the embodiment, the slope detection device may further include a gravity sensor provided inside the structure and detecting a horizontal plane (X-Y plane). In this embodiment, the slope information may be calculated even during movement.

As an additional element, the slope detection device may include a communication unit for communication with a management server located at a remote location, wherein communication information transmitted from the communication unit to the server may contain the three-dimensional slope information. Further, the time providing unit may be a GPS module.

In the meantime, the structure may have a geodesic dome shape or may be concave. Further, the structure may have a shape of a sphere of which a portion is removed, and the sphere is larger than a hemisphere. A support supporting the structure may be further included.

In another embodiment, the slope detection device may further include a screen wall standing at an intermediate distance point between the neighboring optical sensors, in a normal direction from the surface of the structure, the screen wall casting a shadow on some of the optical sensors according to the incidence angle of the sunlight.

Further, the structure may be provided to be exposed on a top portion of an antenna apparatus while being protected by a protective film with transmittance.

In the meantime, as a first embodiment of a detection method, there is provided a slope detection method including: calculating a horizontal plane (X-Y plane) of a horizontal coordinate system through a gravity sensor; calculating, from light quantity data of sunlight measured by each optical sensor, an incidence vector for an incidence direction of the sunlight on the basis of a local coordinate system; acquiring incidence angle information of the sunlight on the horizontal coordinate system by applying a time when the light quantity data is measured, latitude information, and longitude information to a sun path equation; confirming the horizontal coordinate system by calculating a true north direction (Y-axis direction) on the horizontal coordinate system through the horizontal plane (X-Y plane), the incidence vector, and the incidence angle information of the sunlight on the horizontal coordinate system; and calculating three-dimensional slope information of the local coordinate system on the confirmed horizontal coordinate system.

Specifically, the confirming of the horizontal coordinate system may include: calculating a projection vector by projecting the incidence vector onto the horizontal plane (X-Y plane) on the horizontal coordinate system; calculating, on the horizontal plane (X-Y plane), the true north direction (Y axis) by reflecting an azimuth of the sunlight obtained through the incidence angle information of the sunlight on the horizontal coordinate system; and calculating the horizontal coordinate system by calculating an axis (Z axis) perpendicular to the horizontal plane (X-Y plane) and an axis (X axis) perpendicular to the axis (Y axis) indicating the true north direction.

As a second embodiment of a detection method, there is provided a slope detection method including: calculating, at an arbitrary time t1, an incidence vector L_t1 for an incidence direction of sunlight on the basis of a local coordinate system, from light quantity data of the sunlight measured by each optical sensor; acquiring incidence angle information As_t1 and hs_t1 of the sunlight on a horizontal coordinate system by applying the time t1, latitude information, and longitude information to a sun path equation; calculating, at a time t2 different from the arbitrary time t1, an incidence vector L_t2 for the incidence direction of the sunlight on the basis of the local coordinate system, from the light quantity data of the sunlight measured by the each optical sensor; acquiring incidence angle information As_t2 and hs_t2 of the sunlight on the horizontal coordinate system by applying the time t2, the latitude information, and the longitude information to the sun path equation; calculating a horizontal plane (X-Y plane) of the horizontal coordinate system through the obtained incidence vectors L_t1 and L_t2 with different time zones on the local coordinate system, and through the incidence angle information As_t1, hs_t1, As_t2, and hs_t2 of the sunlight based on the horizontal coordinate system; confirming the horizontal coordinate system by calculating a true north direction (Y-axis direction) on the horizontal coordinate system from one of the incidence vectors and the corresponding incidence angle information of the sunlight on the horizontal coordinate system; and calculating three-dimensional slope information of the local coordinate system on the confirmed horizontal coordinate system. Unlike the first embodiment, the second embodiment does not use a gravity sensor.

Specifically, the calculating of the horizontal plane (X-Y plane) may include: calculating two vertical cones each in which the incidence vector is set as a height, an altitude for the sunlight at the same time as the incidence vector is set as a contained angle between the height and a generatrix, and an apex is placed on an origin of the local coordinate system; calculating planes in a pair each involving a tangent simultaneously touching two circles defining bases of the respective cones and involving the origin of the local coordinate system; and determining one of the planes in a pair as the horizontal plane (X-Y plane) of the horizontal coordinate system depending on a temporal order relationship between the two cones and on whether a current location is in a southern hemisphere or a northern hemisphere.

In the meantime, the calculating of the incidence vector may include: collecting, from multiple optical sensors that are provided on a spherical surface in a manner that face different directions and measure a quantity of the sunlight, pieces of output information containing the light quantity data and an ID of the corresponding optical sensor; sorting the pieces of the output information according to size of the light quantity data and selecting several pieces of the output information having higher values according to a preset criterion; and calculating the incidence direction of the sunlight through the selected pieces of the output information and converting the incidence direction to a unit vector so as to compute the incidence vector.

Further, the slope detection method may be applied to an antenna for mobile communication. In this case, a widthwise slope of the antenna may be corrected, and then a tilt angle and an azimuth for the horizontal coordinate system of the antenna may be calculated.

Further, the slope detection method may further include, after the calculating of the three-dimensional slope information, transmitting the three-dimensional slope information to a management server through communication, whereby a remote management system may be configured.

Advantageous Effects

According to the embodiment of the present invention, whether the apparatus such as an antenna for mobile communication which is installed high or at a place difficult to access is directional correctly in accordance with a design intention can be easily determined. Since sunlight is used, influence of cause of an error is reduced compared to the existing geomagnetic sensor, or the like, so that a result of measurement with high reliability is provided and the detection device is provided at low cost.

Other detailed effects of the present invention will be obviously understood by experts or researchers in the art through the detailed description described below or during a process of practicing the present invention.

MODE FOR INVENTION

Figure 1:
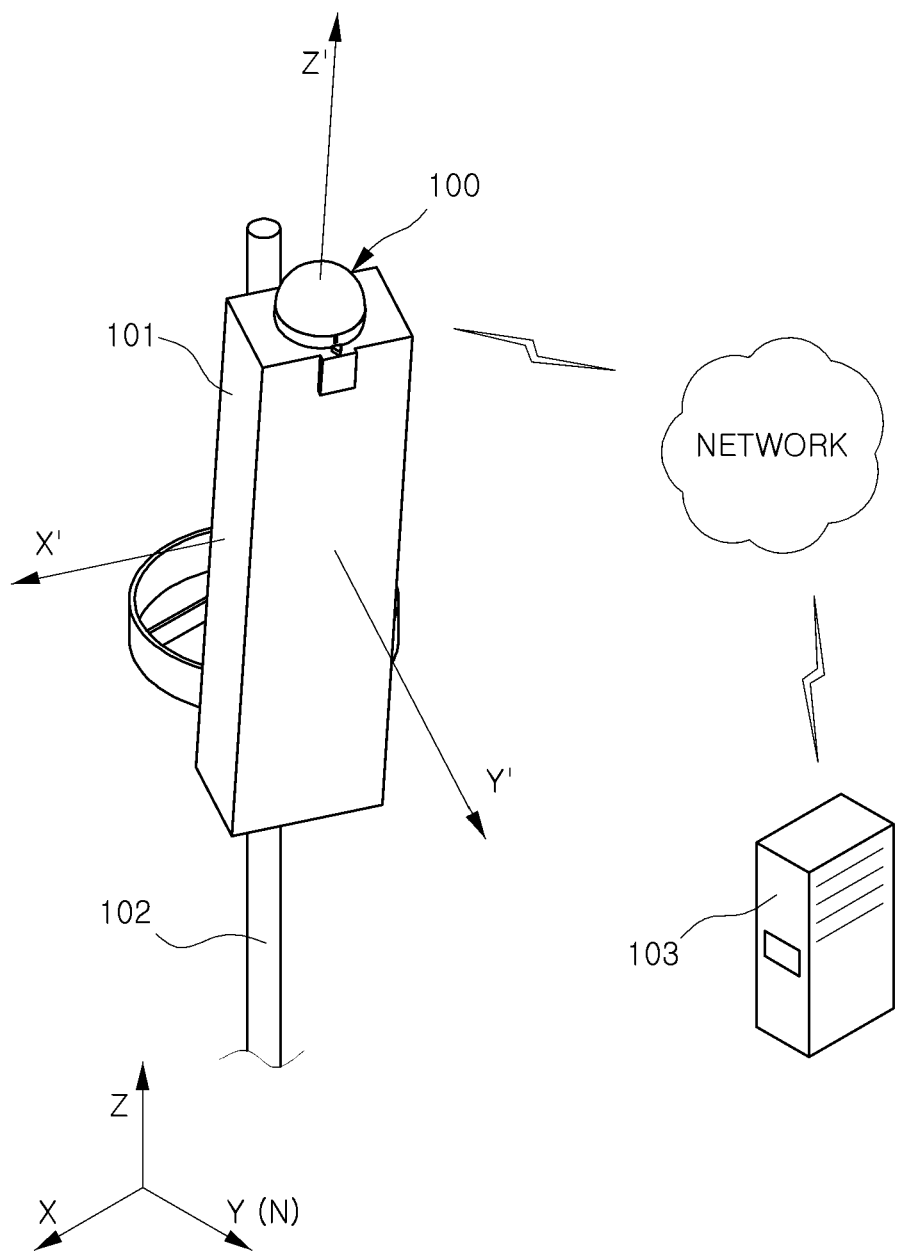
FIG. 1 is a perspective view illustrating a state of use of a three-dimensional slope detection device according to an embodiment of the present invention.

Hereinafter, a configuration, a function, and an operation of a three-dimensional slope detection device and a slope detection method thereof according to the present invention will be described with reference to the accompanying drawings. However, numerals throughout the drawings and embodiments for the same or similar elements will be used in a unified manner.

Also, in the following description, the terms "first", "second", etc. are only used to distinguish elements of which technical meanings are within the scope of identity. That is, any one element may be arbitrarily named "a first element" or "a second element".

The accompanying drawings illustrate adopted embodiments of the present invention, and the embodiments of the present invention should not be construed as limited to the accompanying drawings. From a viewpoint of those of ordinary skill in the art, when a part or all of the illustrations in the drawings is interpreted as irrelevant to a form, a shape, or a sequence inevitably required for the practice of the present invention, the present invention set forth by the appended claims is not limited thereby.

In the following description, a "horizontal coordinate system" is a coordinate system that is originally used to represent positions of celestial bodies in earth science. At a location of a device of which slope is intended to be detected, the horizontal coordinate system is used as a reference coordinate system for determining the slope of the device. Three axes of the horizontal coordinate system are denoted by an "X axis", a "Y axis", and a "Z axis", respectively. Particularly, a true north direction N and the Y-axis direction are the same.

A "local coordinate system" refers to a coordinate system of the slope detection device. The slope detection device has three-dimensional axes perpendicular to each other. These three axes of the local coordinate system are denoted by an X' axis, a Y' axis, and a Z' axis. A positional relationship between multiple elements, specifically, an optical sensor, a gravity sensor, a time providing unit, and the like, of the slope detection device is confirmed by manufacture according to the design. The positional relationship between these elements is determined by particular coordinate values on the local coordinate system. These particular coordinate values are fixed and stored in a memory, or the like.

A "sun path equation" provides the path of the sun on the horizontal coordinate system in azimuth and altitude. An observation position (latitude), date, and time are input, and the azimuth A and the altitude h of the sun are calculated. Such a sun path equation is already open to the public and widely used, and for example, information, programs, or the like related to the sun path equation may be provided from the astronomy education at the university of Nebraska-Lincoln web site (http://astro.unl.edu/naap/motion3/motion3.html), U.S. national oceanic and atmospheric administration web site (https://www.esrl.noaa.gov/gmd/grad/solcalc/), or the like.

The terms "slope information" or "information on slope" are used interchangeably. The "information on slope" provides a three-dimensional slope angle of the slope detection device, specifically, a device in which the slope detection device is provided, on the horizontal coordinate system.

Figure 2:
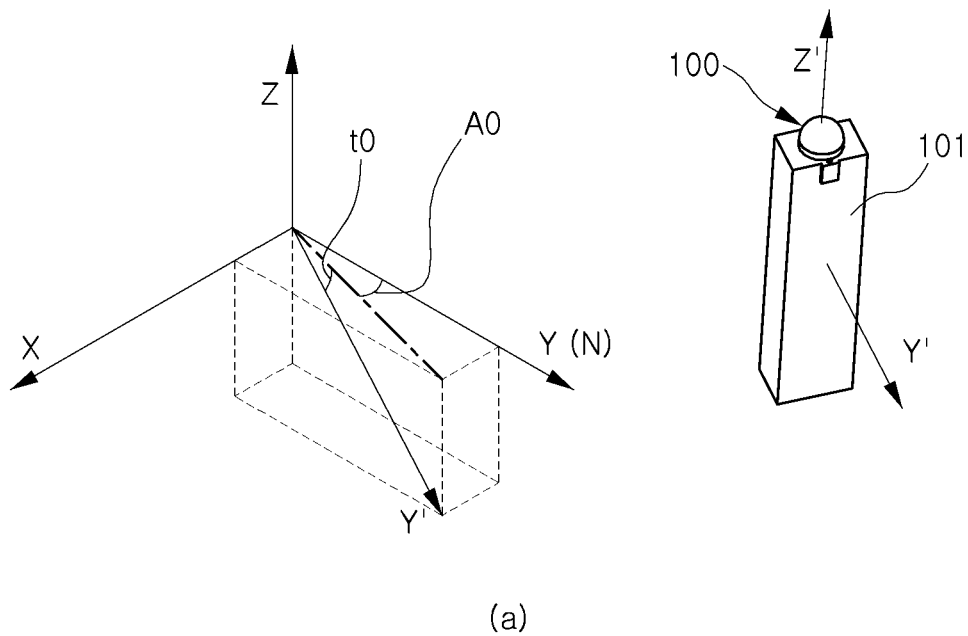
FIG. 2 is a diagram illustrating a horizontal coordinate system and a local coordinate system according to the embodiment shown in FIG. 1.
Figure 2:
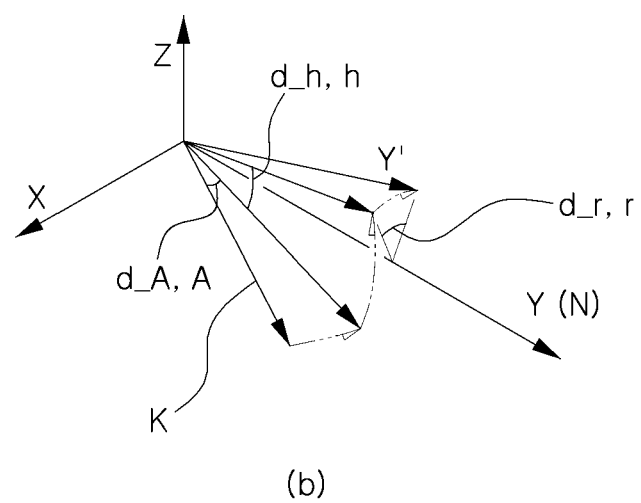

The slope information includes at least the "azimuth", the "altitude", and the "roll angle". Referring to FIG. 2(*b*), the "azimuth" is an angle A that is rotated in a clockwise direction from the true north direction (Y axis) on the horizontal plane (X-Y plane) of the horizontal coordinate system to the Y' axis of the local coordinate system. In the meantime, the "altitude" is an angle h towards the Z axis from the horizontal plane (X-Y plane). Further, the "roll angle" is an angle r that is rotated using the Y' axis as a rotation axis, on the X'-Z' plane of the local coordinate system.

Regarding the coordinate system, as needed, a polar coordinate system or a rectangular coordinate system may be used. Switching between these coordinate systems is the same as that known in the art.

The slope detection device according to an embodiment of the present invention is mounted on a device for use and provides three-dimensional slope information (or referred to as the "information on slope") of the device.

FIG. 1 shows an example of use of a slope detection device according to an embodiment of the present invention. An apparatus that is intended to acquire the information on slope is an antenna apparatus 101 for mobile communication. In addition to the antenna apparatus 101, the slope detection device may be used for various apparatuses of which the slope needs to be measured. Hereinafter, the description will be made mainly for the case where the slope detection device is provided on the antenna apparatus.

The antenna apparatus 101 for mobile communication may be provided on a pillar 102 standing on the ground. The antenna apparatus 101 has the local coordinate system X'Y'Z'. Referring to FIG. 2(*a*), the front of the antenna apparatus 101 is associated with the Y' axis, and the vertical direction of the antenna apparatus 101 is the Z' axis. The antenna apparatus 101 is set to be provided at a particular azimuth A0 and a particular tilt angle t0, and the roll angle is usually set to 0°.

Although not shown, the pillar may be provided with multiple antennas placed radially.

The antenna apparatus 101 is provided with a slope detection device 100. The slope detection device uses the sunlight and is provided at a top portion of the antenna apparatus 101 so that it is advantageous to receive the sunlight. Particularly, a portion that receive light is exposed on the top of the antenna apparatus so that the sunlight is received preferably in many directions.

The slope detection device 100 is provided on the antenna apparatus 101 and is fastened to the antenna apparatus 101, and thus the slope detection device 100 and the antenna apparatus 101 may use the same local coordinate system X'Y'Z'. That is, when the direction that the slope detection device 100 faces is confirmed on the horizontal coordinate system, this is used as a direction that the antenna apparatus 101 faces.

Multiple antenna apparatuses are installed in a distributed manner over a large area where a mobile communication service is provided. In order to ensure an appropriate service area, the antenna apparatus is installed preferably at the highest position, such as the top of the mountain, a roof of a building, or the like. The slope information of the antenna apparatuses may be transmitted to a management server 103 located at a remote location over a network, or the like, for convenience of management. In this case, in transmitting the slope information to the management server 103, communication is performed via the inside of the antenna by using a wireless network or by applying a communication protocol embedded in the antenna apparatus for mobile communication.

The management server 103 may acquire slope information of each apparatus from a large number of antenna apparatuses and may evaluate soundness through comparison with the intended installation direction of the antenna apparatus.

As a result, the soundness of all the antennas is easily evaluated without measuring the direction of each of the antennas at the installation sites. Particularly, in analyzing a communication network for a zone in which a mobile communication service is not smoothly performed, the slope information of the antenna apparatus in charge of the zone may be treated as one of the causes of the failure.

Further, when the antenna apparatus is newly installed or maintenance is performed on the direction of the already installed antenna apparatus, whether the antenna apparatus is installed in the accurate direction is immediately identified.

In FIG. 2(b), a vector K is a vector indicating a designed installation direction of the antenna apparatus. It is shown that as an azimuth increase rate d_A, an altitude increase rate d_h, and a roll angle increase rate d_r on the horizontal coordinate system are reflected, the vector K is changed to a vector Y'.

The azimuth increase rate d_A, the altitude increase rate d_h, and the roll angle increase rate d_r according to comparison of the vector Y and the vector K indicating the installation direction in accordance with the design may be calculated by the management server.

Alternatively, when information on the vector K is stored in the slope detection device, the slope detection device calculates the azimuth increase rate d_A, the altitude increase rate d_h, and the roll angle increase rate d_r.

Figure 3:
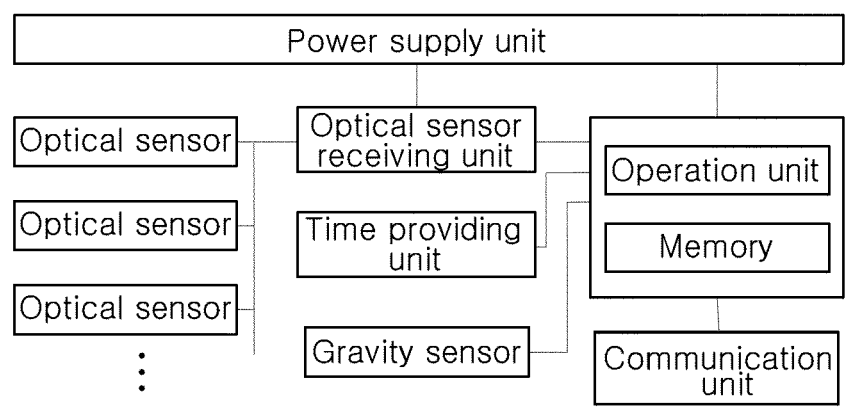
FIG. 3 is a block diagram illustrating schematically a configuration of a three-dimensional slope detection device according to an embodiment of the present invention.
Figure 4:
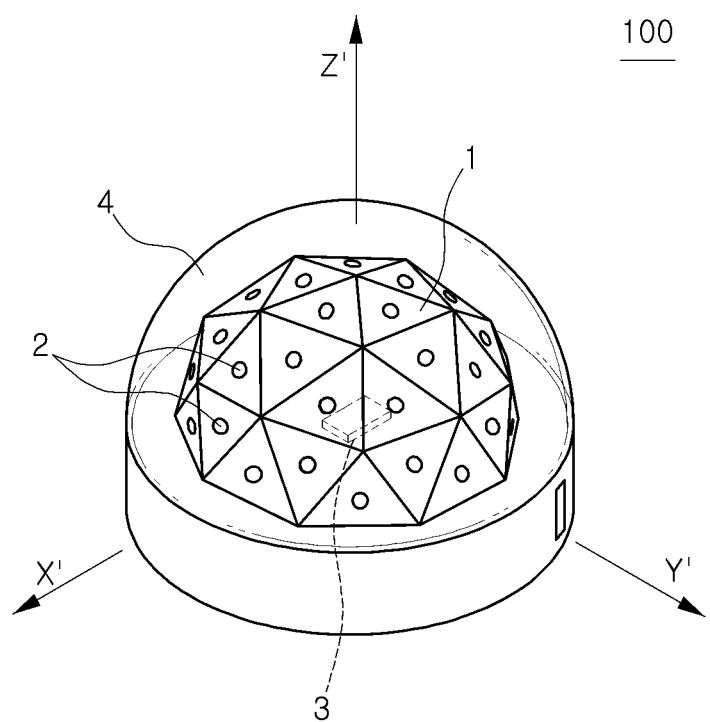
FIG. 4 is a perspective view illustrating arrangement of optical sensors employed in a three-dimensional slope detection device according to an embodiment of the present invention.
Figure 5:
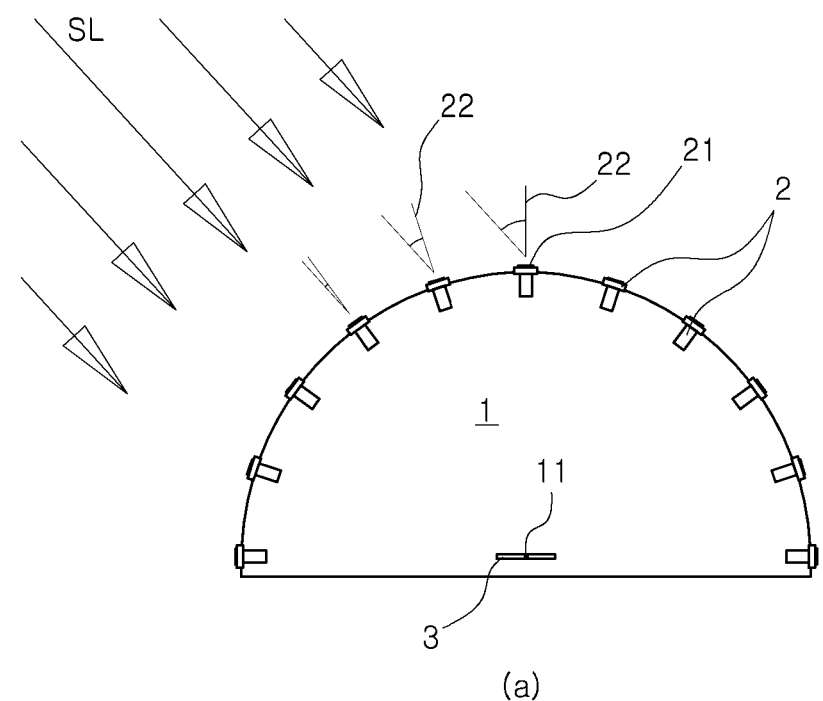
FIG. 5 simply illustrates a state of use of the detection device according to an embodiment of the present invention, FIG. 5(*a*) is a cross-sectional view and FIG. 5(*b*) is a planar view of a portion.
Figure 5:
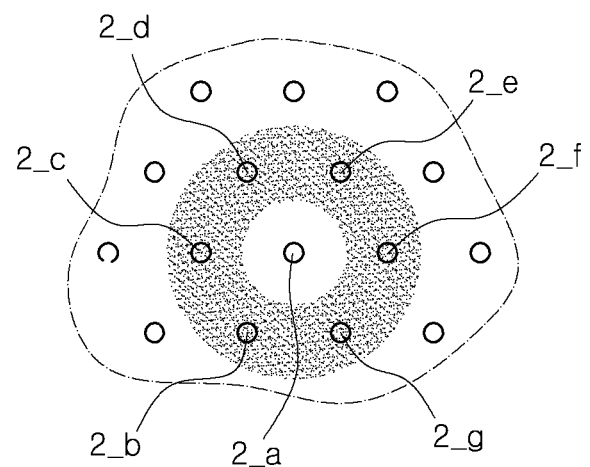

FIGS. 3 to 5 are related to the slope detection device according to an embodiment of the present invention.

The slope detection device according to the embodiment of the present invention includes a structure, multiple optical sensors, an optical sensor receiving unit, a time providing unit, a gravity sensor, and an operation unit. As an additional element, a communication unit may be included.

The structure 1 is provided with a spherical surface in the shape of a hemisphere or the shape close to a sphere beyond a hemisphere. Herein, the spherical surface may be a curved surface or manufactured in a geodesic dome shape. Taking the path of the sun into consideration, only a portion of the whole sphere may be used as the structure.

The multiple optical sensors 2 are provided on the spherical surface of the structure in a manner that face different directions. Herein, a variety of photo sensors capable of measuring the quantity of light may be used as the optical sensors 2. According to the type of optical sensor, in addition to the visible light emitted from the sun, a variety of energy (for example, ultraviolet light, or the like) which is emitted from the sun and varies results of measurement depending on the direction of the light-receiving sensor may be used.

In the embodiment of the present invention, the optical sensors 2 output light quantity data of the received light. The multiple optical sensors are corrected to produce the same output for the same quantity of light.

For convenience of attaching of the optical sensors 2 and the operation, the structure 1 may be provided in a geodesic dome shape, and the optical sensor 2 may be provided at the center of each of the surfaces.

Regardless of whether a hemisphere shape or a geodesic dome shape is selected as the shape of the structure 1, normals 22 perpendicular to respective light receiving surfaces 21 of the optical sensors 2 provided on the surface of the structure 1 may be designed to be focused on the center 11 of the structure 1. This design allows the output of the optical sensor to be used intactly without additional numerical correction of installation angle and position of each of the optical sensors. Therefore, the burden of increase in the amount of various types of operation using output values of the optical sensors is reduced, and a rapid operation result is obtained.

FIG. 5(a) shows multiple optical sensors 2 fixed at regular intervals on a virtual spherical surface. The normal 22 of the light receiving surface 21 of each of the optical sensors 2 is provided to be the same as the normal of the spherical surface.

Arrows obliquely represented in the upper left of the figure denote sunlight SL. In this figure, the optical sensors 2 receives the sunlight SL at different incidence angles, and thus the optical sensors 2 have different output values.

If a sufficient number of optical sensors are provided, the normal direction of the optical sensor having the maximum output value may be regarded as the same as the incidence direction of the sunlight. As described above, it is preferable to use as many optical sensors as possible to enhance resolution. By taking the slope detection device into consideration in size, cost, operation burden, or the like, the number of provided optical sensors may be limited to an appropriate number. Compensation for resolution as a result of the reduction in the number of installations may be solved using an analysis algorithm. This will be described later again.

The optical sensor receiving unit provides an interface receiving output information from the multiple optical sensors. The output information includes an ID of each of the optical sensor, and a measured output value.

The time providing unit provides calendar information on the date and the time when the output information is received from the optical sensor. This calendar information is used as a parameter to be put in the sun path equation.

The time providing unit may be a network clock receiver, a wireless time synchronization extraction module, or a GPS module described later. The calendar information may be obtained through a data communication network. When a network clock is transmitted from a time synchronization server (for example, an NPT server), the network clock is received to extract time information for use. Alternatively, mobile communication signals are demodulated to extract the time information.

Further, the GPS module may be used as the time providing unit. The GPS module may receive the calendar information from a satellite. Further, geographic data (latitude or longitude) for the current location may be obtained. Particularly, in the case where the GPS module is provided, there is an advantage of obtaining slope information of a movable apparatus.

In the meantime, in the case where the calendar information is obtained through the management server, for example, the communication unit is provided, or where the calendar information is obtained through other network communications, the time providing unit may be omitted.

The operation unit may analyze the incidence angle of the sunlight, may calculate the horizontal coordinate system, may calculate the slope information, and so on. The operation unit may include components that a general operation device, such as a CPU, a cache, and the like, includes.

The gravity sensor 3 may be provided inside the structure 1 and detects the direction of gravity. A plane perpendicular to this direction of gravity may be determined as a horizontal plane (X-Y plane) on the horizontal coordinate system.

The gravity sensor 3 may be provided to be matched with the center 11 of the structure 1. Further, the upper surface of the gravity sensor 3 may be set to be parallel to the horizontal of the structure 1, and the installation direction of the gravity sensor 3 may be set to be matched with the X axis or the Y axis of the local coordinate system. Such an installation location of the gravity sensor enables the output value of the gravity sensor 3 to be used without additional correction thereof, similarly to setting the installation angles of the optical sensors with respect to the center of the structure.

In another embodiment, the gravity sensor may be provided inside the structure, but may be provided at a location slightly off the center of the structure. Specifically, the gravity sensor may be provided on the X'-Y' plane of the local coordinate system of the structure, and the vertical axis of the gravity sensor may be provided parallel to the Z' axis of the structure.

The gravity sensor 3 detects the direction in which gravity acts and calculates this as a coordinate value (x1, y1, z1) (see a gravity vector in FIG. 12) on the local coordinate system. Many such gravity sensors are open to the public. For example, there is a model ADXL345 of ANALOG DEVICES, Inc.

In the present invention, there are two method of detecting the horizontal plane (X-Y plane) of the horizontal coordinate system, which are distinguished as a first embodiment and a second embodiment. In the second embodiment of the slope detection method in which a gravity sensor is not used, the gravity sensor may be omitted.

Particularly, when the gravity sensor is omitted, the curved surface of the structure may be concave. Alternatively, a concave polygonal structure with an inverted geodesic dome may be adopted.

As an additional element, the communication unit may provide an interface for accessing a network. The detailed configuration of the communication unit may be the same as that known in the art. By providing the communication unit, communication with the management server located at a remote location is possible. The communication unit may transmit three-dimensional slope information obtained through the operation unit to the management server.

Further, necessary data such as a measurement start command for generating the slope information, the calendar information, the position information (longitude or latitude), a sun path equation program, or the like may be received from the management server.

In the meantime, the communication unit may be configured only for transmission. In this case, the measurement start command, the calendar information, the position information (longitude or latitude), the sun path equation program, or the like may be previously stored in a memory within the slope detection device, or may be acquired by the detection device through the time providing unit, the GPS module, or the like.

Further, as an additional element, a protective film 4 covering the structure 1 in a spaced manner may be included. The protective film 4 may be made of a material capable of smooth light transmission, and antifouling coating may be performed on the surface of the film to reduce contamination. Any transparent material and any antifouling coating material that are capable of enabling pollutants to be washed off by rainwater may be used. A part of many known techniques already developed may be selected and applied.

Figure 6:
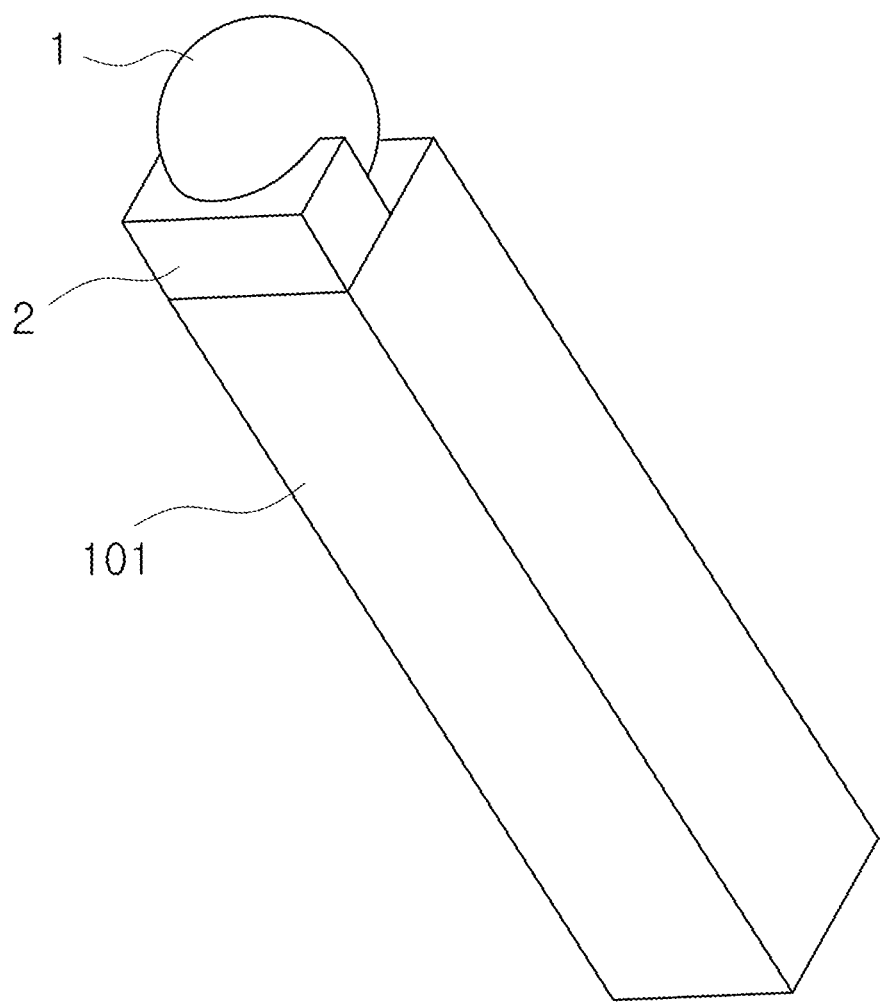
FIG. 6 is a perspective view illustrating a three-dimensional slope detection device of which a structure has a different shape according to an embodiment of the present invention.
Figure 7:
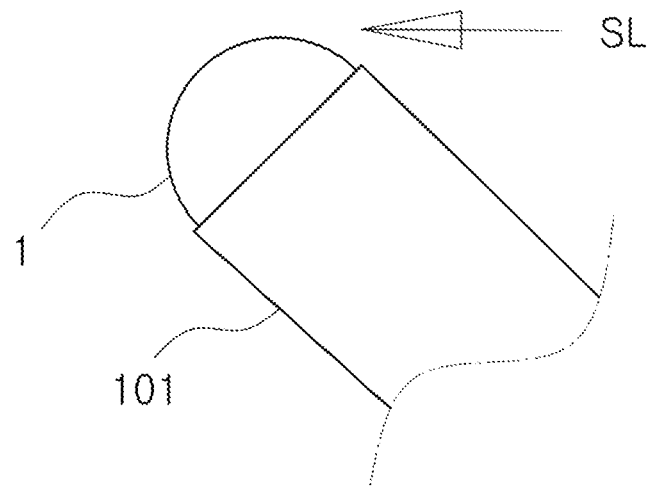
FIG. 7 is a schematic diagram illustrating a state in which a three-dimensional slope detection device according to an embodiment of the present invention receives sunlight in a high-latitude region.
Figure 7:
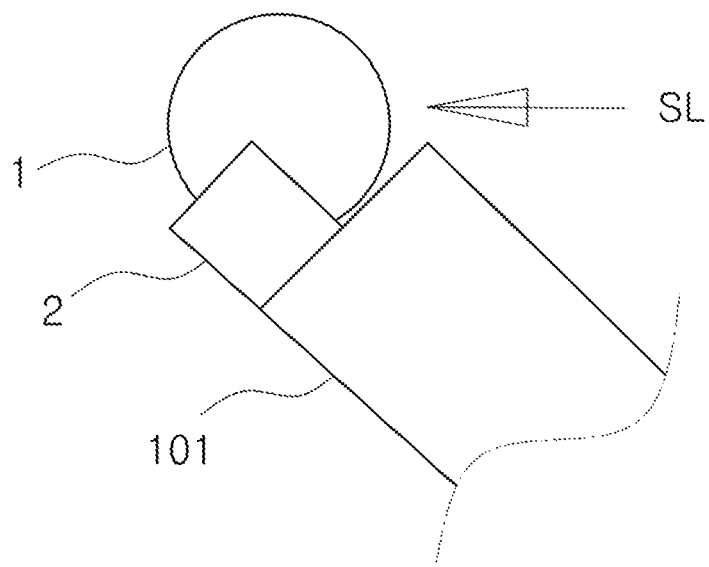

FIGS. 6 and 7 are related to a slope detection device in which the structure is provided with a spherical surface in the shape of close to a sphere beyond a hemisphere.

Referring to the figures, the structure has a shape of a sphere of which a portion is cut out, specifically, a shape in which an area where two perpendicular planes meet is removed from a whole sphere.

The structure is supported by a support. Referring to the figures, the support having a hexahedral shape is coupled to the cut-out portion of the structure to support the structure, and a space is defined therein so that various elements such as the time providing unit, the operation unit, and the like may be provided.

The structure may be in a range larger than a hemisphere shape and smaller than a whole sphere shape, and the support may have a flat plane to be easily mounted on the top portion of the antenna apparatus.

FIG. 7 shows a case where an antenna is installed in a high-latitude region and a surface of the antenna faces the north and is installed at a slope of 45°. As the antenna is installed at a slope, the structure placed on the antenna is also tilted as much as the slope of the antenna.

Since the altitude of the sun in a high-latitude region is low, which is well known, it is difficult for the sunlight to reach the structure in the hemisphere shape in the normal direction as shown in FIG. 7(a) and it is also difficult to detect the sunlight.

As described above, the structure having the hemisphere shape is not sufficient to measure the direction of the sun by mounting the structure on a sloping object (antenna) and by detecting the incidence light of the sun regardless of the region on the earth. In order to use the structure having the hemisphere shape, a separate deriving unit is required to detect the sunlight by appropriately moving the structure.

However, as shown in FIG. 7(b), when a structure having a shape beyond a hemisphere is supported by the support for use, the lower portion of the hemisphere is capable of detecting the sunlight.

Therefore, without the driving unit for moving the structure, the sunlight is easily detected regardless of the measurement region, and the sunlight is easily detected in any region on the earth, and thus the slope of the antenna is measured.

Figure 8:
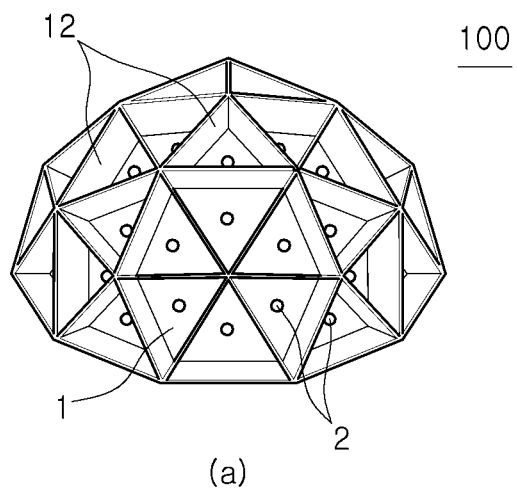
FIG. 8 is related to a three-dimensional slope detection device according to another embodiment of the present invention, FIG. 8(*a*) is a perspective view, and FIG. 8(*b*) is a cross-sectional view illustrating a state of use.
Figure 8:
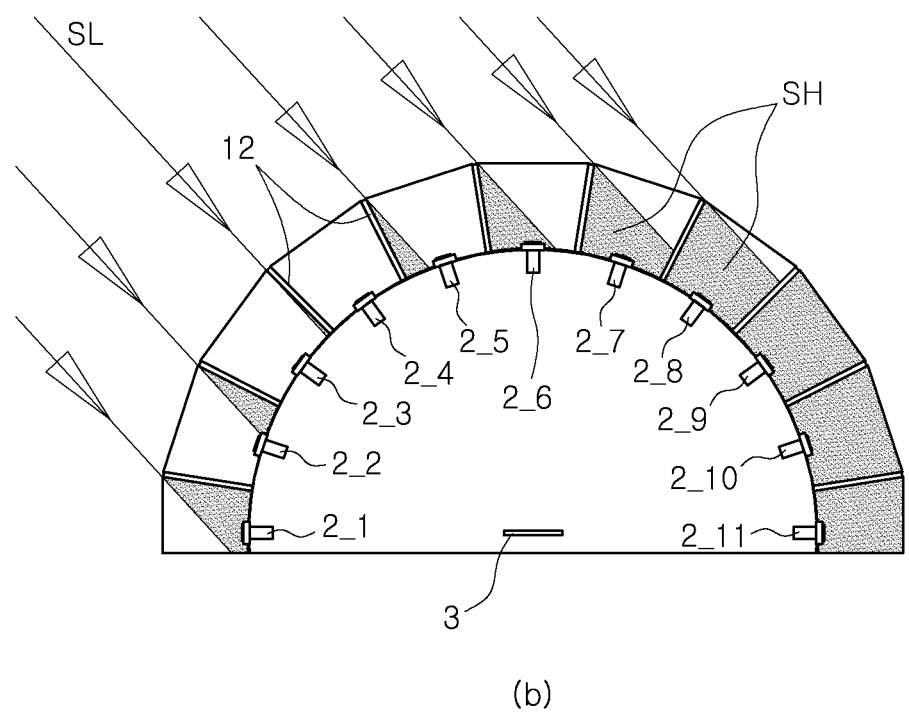
Figure 9:
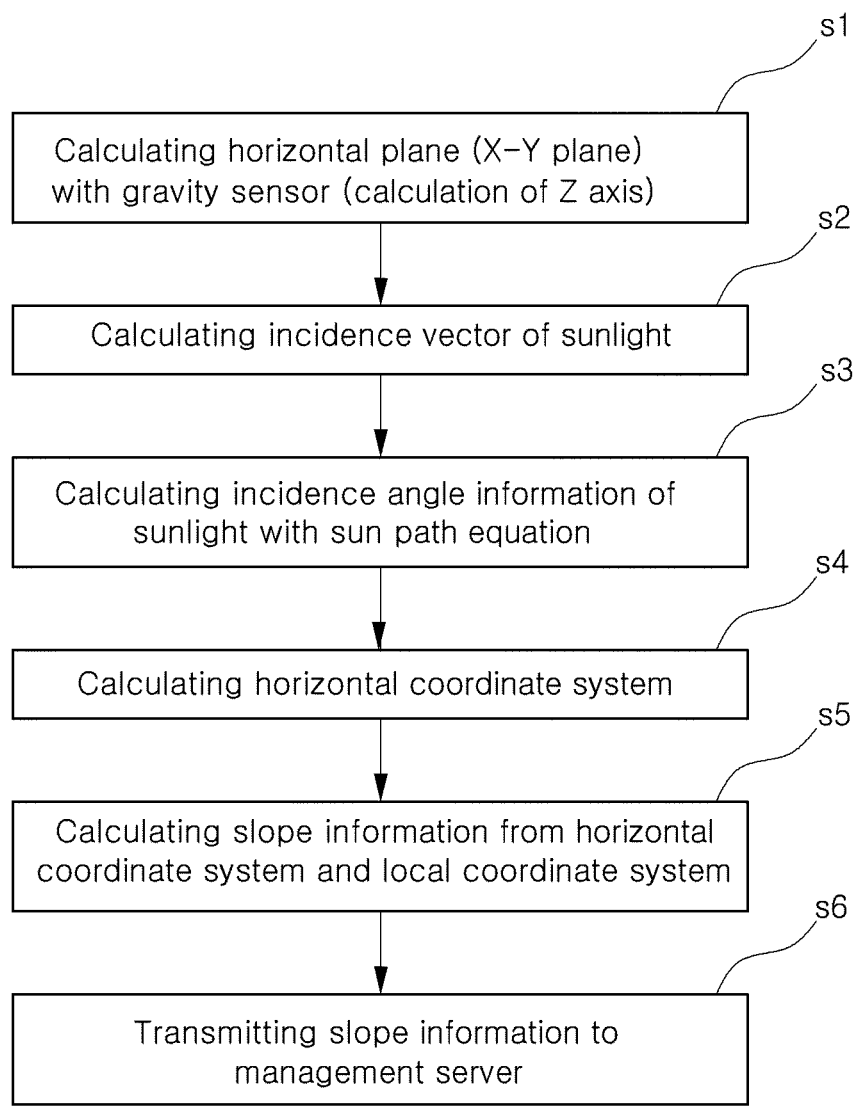
FIG. 9 is a flowchart schematically illustrating a slope detection method according to a first embodiment of the present invention.

In the meantime, FIG. 8 is related to a slope detection device according to another embodiment of the present invention.

The slope detection device 100 according to the embodiment of the present invention includes a structure 1, multiple optical sensors 2, an optical sensor receiving unit, a time providing unit, a gravity sensor 3, and an operation unit. As an additional element, a communication unit or a protective film 4 may be included. The features of the elements of the slope detection device according to the above-described embodiment may be included as they are without departing from the scope that does not conflict with the detail described below.

The structure 1 adopted in the slope detection device according to the embodiment is provided in a spherical shape or a geodesic dome shape similarly to the structure according to the above-described embodiment, and further includes a screen wall 12.

The screen wall 12 stands at the intermediate distance point between neighboring optical sensors, in the normal direction from the surface of the structure 1. The structure 1 casts shadows on some optical sensors according to the incidence angle of the sunlight.

In FIG. 8(b), due to the screen walls 12, shadows SH are cast on several optical sensors 2_1 and 2_6 to 2_11. The optical sensors 2_1 and 2_6 to 2_11 of which the light receiving surfaces 21 are shaded have very low outputs compared to the optical sensors 2_2 to 2_5 receiving light and thus are certainly excluded when selecting the optical sensor to be analyzed. A method of selecting some optical sensors that are targets to be analyzed will be described later.

FIGS. 9 to 14 are related to a slope detection method according to the first embodiment of the present invention.

The slope detection method according to the first embodiment uses the detection device provided with a gravity sensor and includes calculating a horizontal plane at step s1, calculating an incidence vector of sunlight at step s2, calculating incidence angle information of the sunlight from a sun path equation at step s3, calculating a horizontal coordinate system therefrom at step s4, and calculating slope information at step s5. Further, the slope detection method may include transmitting the slope information to a management server at step s6.

[Calculating of the Horizontal Plane (X-Y Plane) of the Horizontal Coordinate System from the Gravity Sensor]

Figure 12:
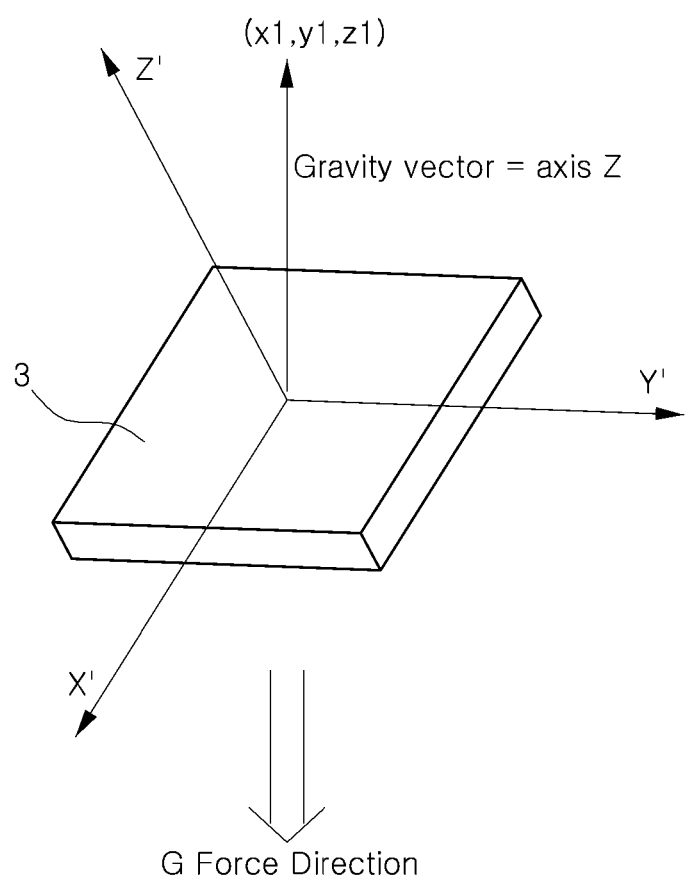
FIG. 12 is a diagram related to a process of calculating a horizontal plane through a gravity sensor according to the first embodiment in FIG. 9.
Figure 12:
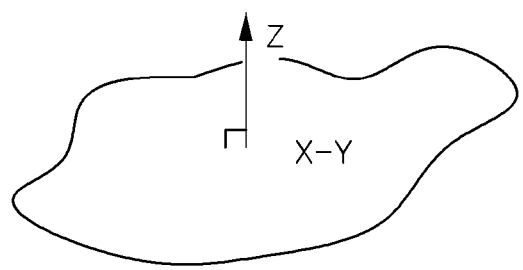

FIG. 12 is related to the gravity sensor 3 and the horizontal plane (X-Y plane). The local coordinate system X', Y', Z' is in a state of sloping in an arbitrary direction in three dimensions according to the current state of the detection device. The gravity sensor 3 also slopes in the arbitrary direction according to the local coordinate system.

Gravity acts vertically downwards, and the gravity sensor 3 outputs, with respect to gravity, a gravity vector as particular coordinate values (x1, y1, z1) of the local coordinate system. The gravity vector is a vector perpendicular to the horizontal plane of the horizontal coordinate system, so that the gravity vector is the Z axis (vertical axis) of the horizontal coordinate system. Further, a plane perpendicular to the Z axis is calculated as the horizontal plane (X-Y plane) on the horizontal coordinate system.

[Calculating of an Incidence Vector L for an Incidence Direction of Sunlight]

Figure 10:
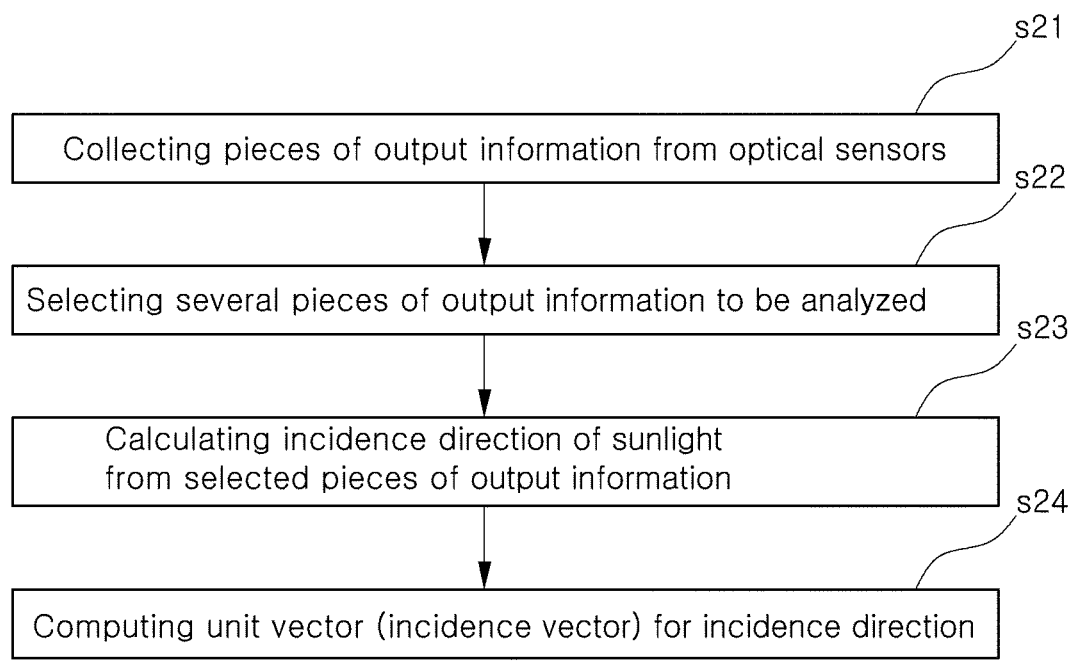
FIG. 10 is a detailed flowchart illustrating a step of calculating an incidence vector of sunlight according to the first embodiment in FIG. 9.

FIGS. 5 and 10 are related to the calculation of the incidence vector. Herein, the incidence vector L is a unit vector towards the sun on the basis of the origin of the local coordinate system and indicates the incidence direction of sunlight.

A method of calculating the incidence vector L from the multiple optical sensors 2 includes collecting pieces of output information of the optical sensors at step s21, selecting several pieces of output information meaningful to be analyzed at step s22, calculating the incidence direction of the sunlight from the selected output information at step s23, and computing the unit vector (incidence vector L) for the incidence direction at step s24.

The output information of each optical sensor is stored in the memory through the optical sensor receiving unit and is provided to the operation unit.

The operation unit may sort pieces of the output information according to size and may select several pieces of the output information to be analyzed. Herein, the selected pieces of the output information contain higher values including the highest value of the measured quantity of light.

Herein, the sorting and the selecting of the output information may be selected from a variety of known algorithms.

Further, the number of pieces of the output information to be analyzed may be arbitrarily set by the user according to the number of the provided optical sensors, or the like. For example, when a large number of optical sensors are provided so that sufficient resolution is provided, one optical sensor having the maximum output value is selected. In this case, the coordinate values of the optical sensor may be indicative of the incidence direction of the sunlight.

In FIG. 5(a), the incidence angle of the sunlight SL does not match with any of the normal directions of the optical sensors 2. However, according to similarity between the light receiving surface 21 of the optical sensor 2 and the incidence angle of the sunlight SL, light quantity data measured by each optical sensor varies.

In this case, several optical sensors having the output information (light quantity data) of which the values are relatively high may be selected. As shown in FIG. 5(b), it is expected that the selected optical sensors is the optical sensor 2_a having the output information with the maximum value and nearby optical sensors 2_b to 2_g. As described above, in order to consider the optical sensor 2_a having the output information with the maximum value and the nearby optical sensors 2_b to 2_g, sequential increase and decrease degrees of the sorted pieces of the output information are compared to an arbitrary reference value (reference increase and decrease rate) so that the pieces of the output information are grouped.

For example, the pieces of the output information (light quantity data) are sorted, (1.4), (1.33), (1.31), (1.3), (1.26), (1.25), (1.24), (1.1), (1.05), . . . , in that order. When the reference value is 0.1, (1.4) to (1.24) may be included in group 1. The light quantity data 1.1, which differs from the immediately preceding light quantity data (1.24) by more than 0.1, and the subsequent light quantity data may be included in another group. Only the meaningful group 1 is determined as an analysis target.

From the selected pieces of the output information, the coordinate values of the optical sensors which are analysis targets may be identified through the IDs of the optical sensors. Through mathematical analysis of these coordinate values, the incidence direction of the sunlight may be calculated. Herein, as the mathematical analysis, a variety of open analysis methods, such as an interpolation method, a linear analysis, a statistical analysis, and the like may be applied. Further, considering the size difference of the light quantity data as a weighting in the mathematical analysis, a more accurate sunlight incidence direction may be calculated.

The sunlight incidence direction is computed using the coordinate value of the local coordinate system for any one point on the spherical surface, and incidence vector is calculated by taking the unit size.

Figure 13:
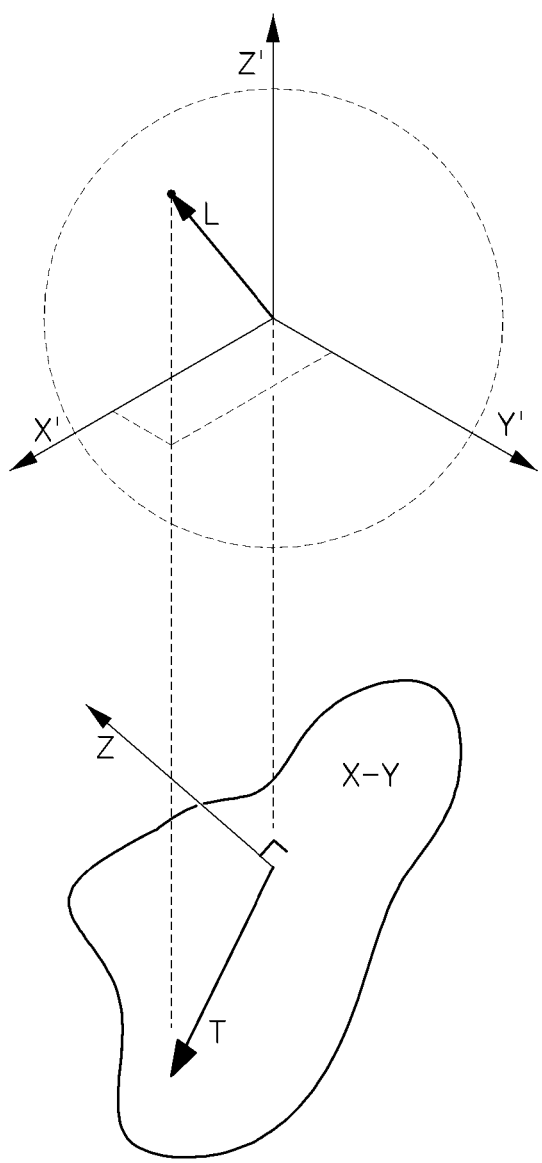
FIGS. 13 and 14 are diagrams related to a process of calculating a horizontal coordinate system according to the first embodiment in FIG. 7.

Referring to FIG. 13, the incidence vector L indicates the sunlight incidence direction on the local coordinate system and may be represented as a point on the surface of a virtual unit size sphere with the center of the local coordinate system.

In the meantime, in the detection device 100 according to the embodiment in FIG. 8, the screen wall 12 causes shadows SH to be cast on some optical sensors, and thus large gaps in the light quantity data occur. Accordingly, there is an advantage in that optical sensors 2_2 to 2_5 are certainly selected to be excluded. Particularly, In the case where an optical sensor with low sensitivity is adopted, where the quantity of incident sunlight is small due to cloudy weather, or the like, there is an advantage in that it is possible to make a big difference between the output information of the optical sensors that are artificially perpendicular or nearly perpendicular to the sunlight and the output information of the optical sensors that are not.

[Acquiring of the Incidence Angle Information of the Sunlight Through the Sun Path Equation]

When the date and the time when the antenna is installed are input to the sun path equation, the incidence angle information (azimuth and altitude) of the sunlight based on the horizontal coordinate system is identified. The path of the sun is repeated with a cycle of one year, and this is general knowledge in earth science and thus a repeated description is omitted herein.

A table or program for the path of the sun may be embedded in the detection device or may be provided from the management server through the communication unit. Further, the latitude for calculating the incidence angle information of the sunlight may be obtained from the provided GPS module or may be input to the detection device in advance. The date and the time may be obtained from the time providing unit (or the GPS module). Alternatively, the latitude, the date, and the time may be received from the management server. As described above, an implementation method of obtaining the incidence angle information of the sunlight by using the sun path equation may be modified in various ways.

[Calculating of the Horizontal Coordinate System]

Through the horizontal plane (X-Y plane), the incidence vector, and the incidence angle information of the sunlight that are calculated, the true north direction (Y axis) and the X axis of the horizontal coordinate system are calculated to confirm the horizontal coordinate system.

Figure 11:
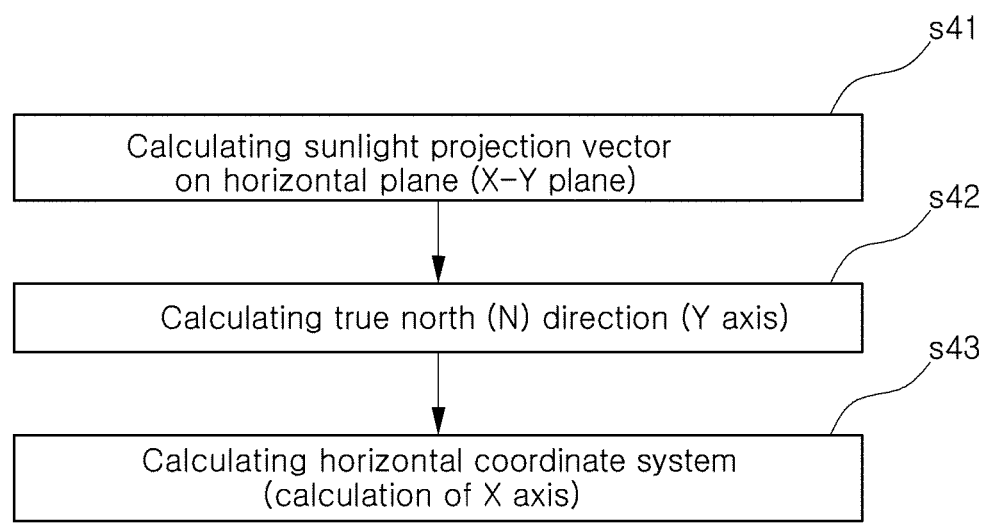
FIG. 11 is a detailed flowchart illustrating a step of calculating a horizontal coordinate system according to the first embodiment in FIG. 9.

Referring to FIG. 11, the calculation includes calculating a projection vector by projecting an incidence vector (local coordinate system) on the horizontal plane (X-Y plane) of the horizontal coordinate system at step s41, calculating a true north direction by rotating the projection vector with the use of the azimuth of the incidence angle information of the sunlight at step s42, and calculating the horizontal coordinate system XYZ by determining the X axis perpendicular to the Z axis and the Y axis at step s43.

Figure 14:
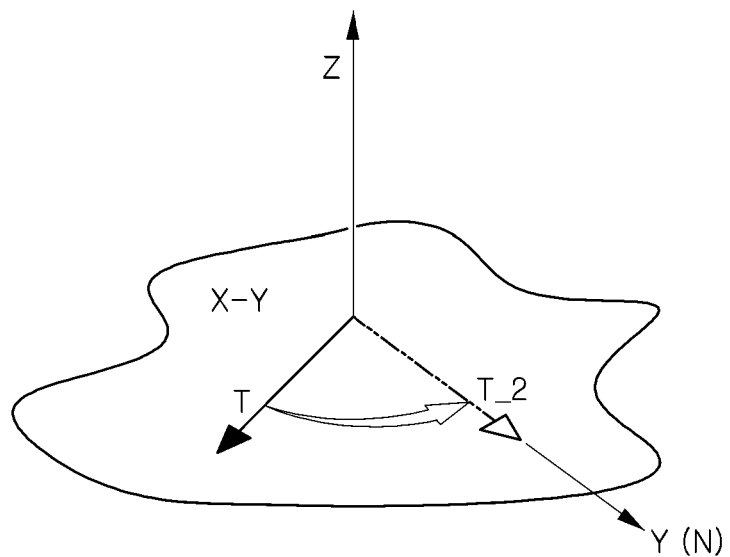
Figure 14:
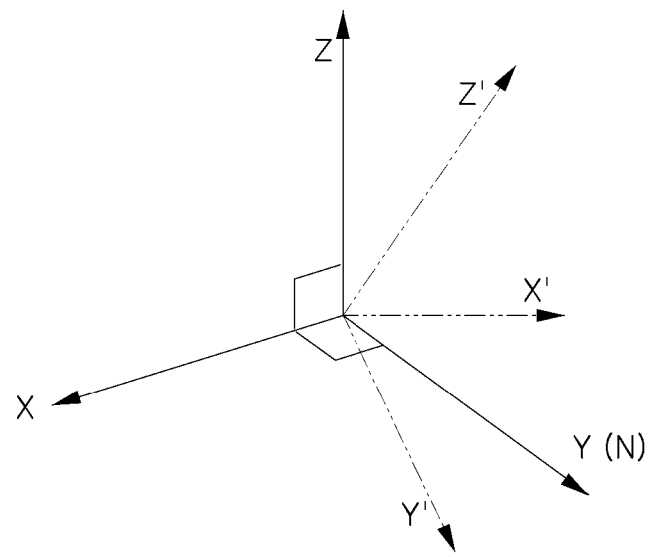

FIGS. 13 and 14 are related to the above steps s41 to s43 for calculating the horizontal coordinate system.

In FIG. 13, the incidence vector L is represented in the local coordinate system X'Y'Z'. The incidence vector may be projected on the horizontal plane (X-Y plane) of the horizontal coordinate system to calculate a projection vector T. In calculating the projection vector T, a trigonometric function and a contained angle between the Z' axis and the Z axis are used.

The direction of the projection vector T indicates the direction in which the sun is positioned on the horizontal plane (X-Y plane) of the horizontal coordinate system.

The incidence angle information contains data of azimuth As and altitude hs of the sun on the basis of the horizontal coordinate system, at the time same as the time when the incidence vector is generated. Among them, the azimuth data is used to rotate the projection vector backwards on the horizontal plane (X-Y plane) (see FIG. 14(a)). The direction that the projection vector T_2 rotated backwards by the azimuth As indicates is the true north N direction of the horizontal coordinate system and is the Y axis direction of the horizontal coordinate system.

From the calculated Y axis and the already known Z axis, the X axis perpendicular to the axes is determined, thereby calculating the horizontal coordinate system XYZ in which all the X axis, the Y axis, and the Z axis are determined.

[Calculating of the Slope Information]

Referring to FIG. 14(b), since the horizontal coordinate system XYZ obtained through the above-described processes is computed on the basis of the local coordinate system X'Y'Z', an interrelation between the horizontal coordinate system and the local coordinate system may be known. Which direction the local coordinate system is rotated in and how much the local coordinate system is rotated on the basis of the horizontal coordinate system are computed so that the information on slope which includes the azimuth, the altitude, and the roll angle is calculated.

As described above, the incidence angle of the sunlight may be analyzed; the horizontal coordinate system may be confirmed from the local coordinate system of the antenna by using the calendar information, the sun path equation, and the gravity sensor; and according to the interrelation with the local coordinate system, the azimuth that the antenna faces on the horizontal coordinate system and the tilting angle may be identified.

[Transmitting of the Slope Information to the Management Server]

The slope information may be transmitted to the management server through the communication unit. Herein, the slope information contains the ID of the antenna, the azimuth, the altitude, and the roll angle, and may further include a time stamp, and a Z' vector value based on the horizontal coordinate system.

The slope information to be transmitted may contain additional data obtained by processing the azimuth, the altitude, the roll angle, and the like. For example, instead of the altitude, the tilt angle (the contained angle between the Z axis and the Z' axis of the antenna) of the horizontal coordinate system may be transmitted. Alternatively, polar coordinate values may be replaced with coordinate values of the rectangular coordinate system.

Particularly, in the case of application to an antenna for mobile communication, regarding the slope information, the widthwise slope (roll angle) of the antenna may be corrected to be perpendicular to the horizontal plane (X-Y plane) of the horizontal coordinate system, and then the current azimuth and the current tilt angle of the antenna for the horizontal coordinate system may be calculated.

The installation direction of the antenna for mobile communication is usually set with the azimuth and the tilt angle, and at the setting step, the roll angle is naturally considered to be 0°.

When the roll angle is 0°, the azimuth and the tilt angle of the antenna are of main concerns. Reflecting this fact, the local coordinate system may be rotated so that the roll angle is 0°, and then the azimuth and the tilt angle may be calculated as the slope information. The slope information calculated and transmitted to the management server may be immediately compared to the design value, and abnormality may be quickly determined.

Further, when the measured roll angle exceeds a particular level, the direction that the antenna faces is greatly deviant, and thus the azimuth and the tilt angle are meaningless. Considering this, when the roll angle exceeds a particular level, it is configured to return the azimuth and the tilt value as null values (NULL).

Figure 15:
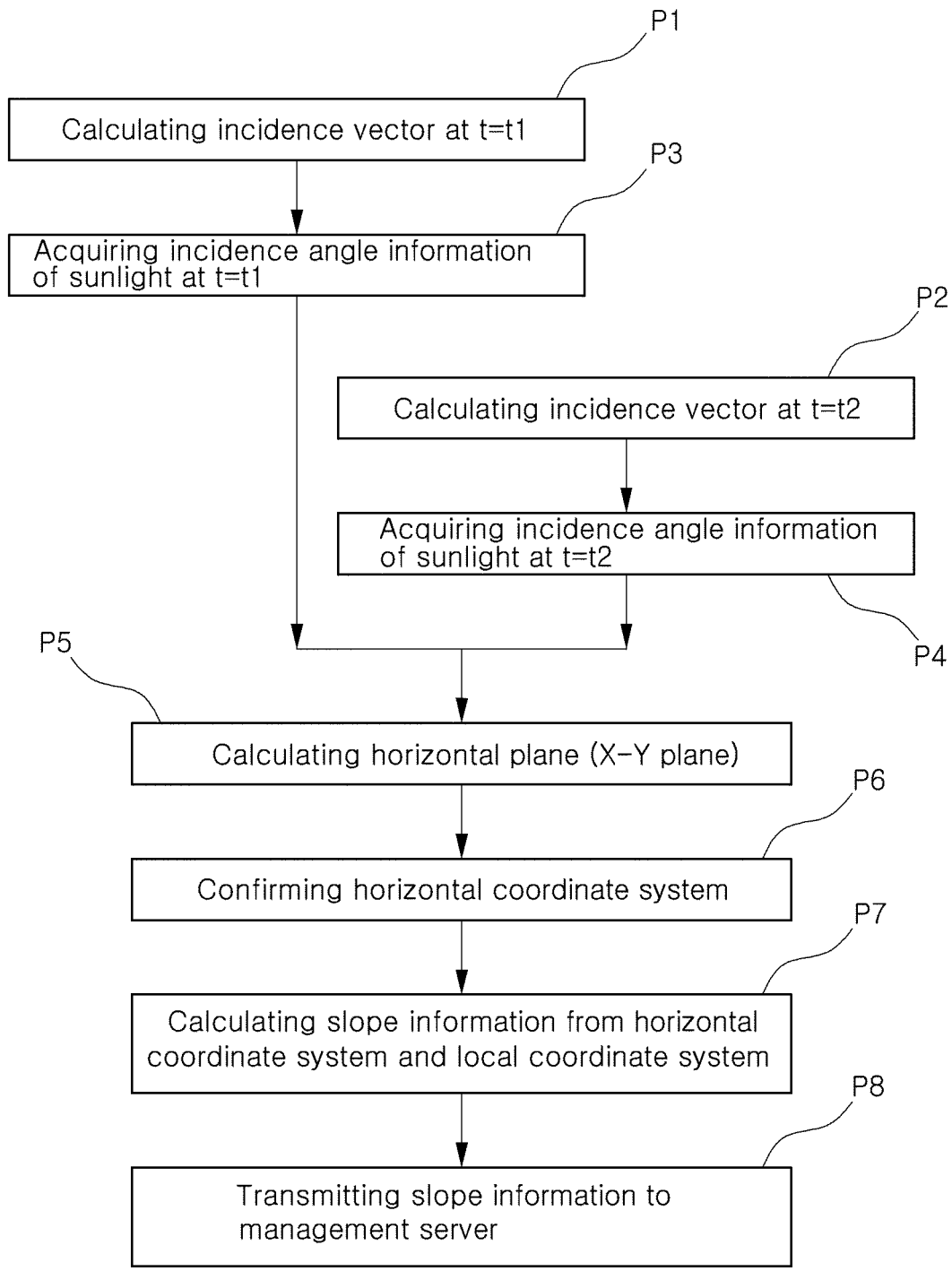
FIG. 15 is a flowchart schematically illustrating a slope detection method according to a second embodiment of the present invention.
Figure 16:
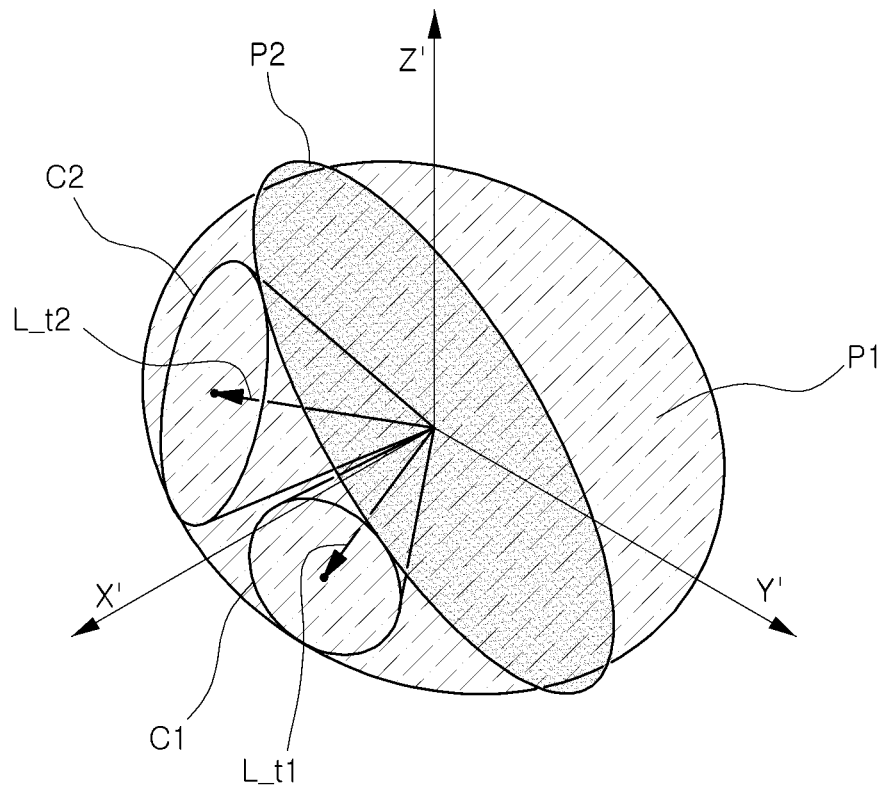
FIG. 16 is a diagram related to a process of calculating a horizontal plane according to the second embodiment in FIG. 13.
Figure 16:
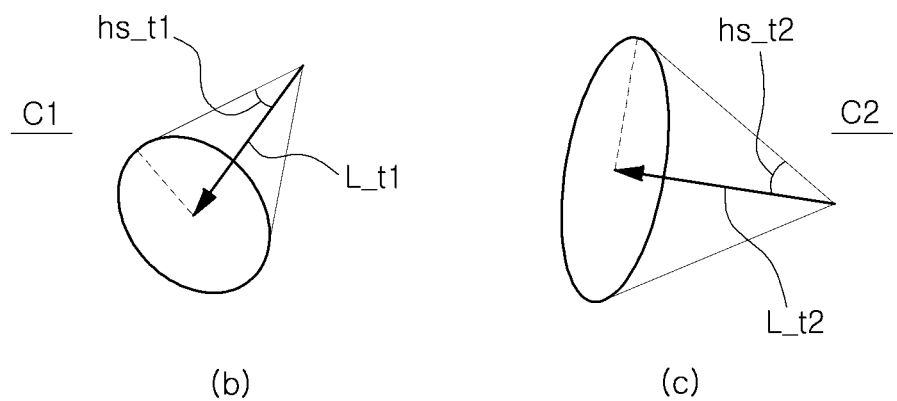
Figure 17:
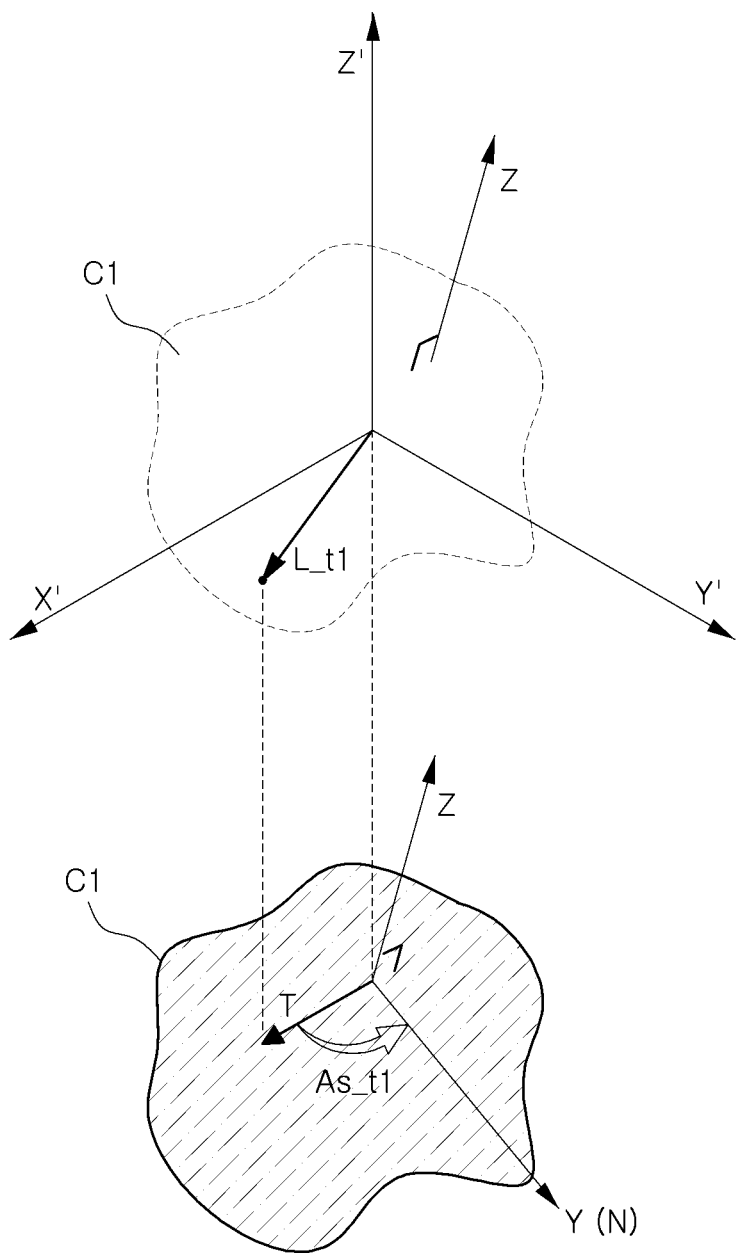
FIG. 17 is a diagram related to a process of confirming a horizontal coordinate system according to the second embodiment in FIG. 13.

FIGS. 15 to 17 are related to a slope detection method according to the second embodiment of the present invention.

In the slope detection method according to the second embodiment of the present invention, a gravity sensor is not used. Instead, the movement of the sun according to time difference is used in order to calculate the horizontal plane (X-Y plane) of the horizontal coordinate system.

Without departing from the scope that does not conflict with the detail described below, the features of respective steps according to the first embodiment may be applied practically equally to the corresponding steps according to the second embodiment.

Specifically, referring to FIG. 15, the method according to the second embodiment includes calculating two incidence vectors with time difference at steps p1 and p2, acquiring incidence angle information of sunlight at each time at steps p3 and p4, calculating a horizontal plane at step p5, calculating a horizontal coordinate system at step p6, and calculating slope information at step p7. In addition, as in the first embodiment, the method includes transmitting the slope information to the management server at step p8.

Herein, it is allowable for either the calculating of the incidence vectors with time difference at step p1 or step p2 to be performed first, unless performed at the same time. However, the order of time affects the calculating of the horizontal plane (X-Y plane), so that it is necessary to known which step of step p1 and step p2 is performed first. However, hereinafter, for convenience of description, it is assumed that the time point t1 precedes the time point t2.

Further, when the result values (vector, and information) vary with time, expressions _t1 and _t2 are added for distinguishing.

[Calculating of the Two Incidence Vectors with Time Difference]

At an arbitrary time (t=t1), from the light quantity data of the sunlight measured by each of the optical sensors, an incidence vector L_t1 for the incidence direction of the sunlight on the basis of the local coordinate system X'Y'Z' is calculated.

At a time t2 different from the arbitrary time t1, an incidence vector L_t2 for the incidence direction of the sunlight is calculated in the same manner.

Since the position of the sun is shifted by the time difference, the incidence vector L_t1 at the time t1 and the incidence vector L_t2 at the time t2 are different.

In order to secure sufficient reliability, the time difference between t1 and t2 may be at least 30 minutes, preferably a time unit.

The detailed configuration for calculating the incidence vectors L_t1 and L_t2 from the output information of the optical sensors is practically the same as that of the first embodiment, and thus a repeated description will be omitted.

[Acquiring of the Incidence Angle Information of the Sunlight Through the Sun Path Equation]

The latitude of the antenna apparatus, the date, and the times t1 and t2 are put in the sun path equation, and the incidence angle information (azimuths As_t1 and As_t2) and altitudes hs_t1 and hs_t2) of the sunlight on the horizontal coordinate system is acquired.

Depending on the time difference between t1 and t2, pieces of the incidence angle information indicating the position of the sun also differ.

The details such as a parameter of the sun path equation, or the like are practically the same as those of the first embodiment, and thus a repeated description will be omitted.

[Calculating of the Horizontal Plane (X-Y Plane) of the Horizontal Coordinate System]

In the second embodiment, in order to calculate the horizontal plane (X-Y plane) of the horizontal coordinate system, the obtained incidence vectors L_t1 and L_t2 and the pieces of the incidence angle information As_t1, As_t2, hs_t1, and hs_t2 are used to conduct a geometric analysis. Further, the current latitude (specifically, distinction between the northern hemisphere and the southern hemisphere) is referenced.

In detail, the calculation includes: calculating vertical cones on the local coordinate system from the incidence vectors L_t1 and L_t2 and the incidence angle information As_t1, As_t2, hs_t1, and hs_t2 at the corresponding times, respectively; calculating planes P1 and P2 in a pair each involving a tangent simultaneously touching two circles defining bases of the respective cones, and involving the origin of the local coordinate system; and determining one of the planes P1 and P2 in a pair as the horizontal plane (X-Y plane) of the horizontal coordinate system.

In FIG. 16(a), two cones C1 and C2 are based on t1 and t2. FIGS. 16(b) and 16(c) shows separation thereof for ease of understanding.

In the figures, the heights of the cones C1 and C2 are the incidence vectors L_t1 and L_t2. The incidence vectors L_t1 and L_t2 are vector values that determine directions in which the cones C1 and C2 are placed, respectively.

The contained angles between the generatrices and the heights (incidence vectors) of the cones C1 and C2 correspond to the altitudes hs_t1 and hs_t2 of the sun. Herein, the altitudes hs_t1 and hs_t2 are obtained from the incidence angle information of the sunlight.

For example, assuming that t1 and t2 belong to the time zone in the morning, the altitude hs_t1 is smaller than the altitude hs_t2 of time t2 close to noon. This is the reason why the contained angle of the cone C1 is smaller than the contained angle of the cone C2.

The apexes of the two cones C1 and C2 which are shifted to the origin of the local coordinate system are shown in FIG. 16(a).

The planes P1 and P2 in a pair that are circumscribed by the bases (circles) of the cones C1 and C2 and simultaneously involve the origin of the local coordinate system may be selected.

There is a difference as much as the altitudes hs_t1 and hs_t2 of the sun at the particular times t1 and t2. One of the planes P1 and P2 that pass through the origin of the local coordinate system is the horizontal plane (X-Y plane) of the horizontal coordinate system.

Specifically, which plane among the planes P1 and P2 in a pair is the horizontal plane of the horizontal coordinate system varies depending on whether the measured position (antenna position) is in the northern hemisphere and the southern hemisphere. Considering the facts that the path of the sun moves from east to west over time and that the path of the sun slants to the south in the northern hemisphere and slants opposite in the southern hemisphere, one of the planes may be determined as the horizontal plane (X-Y plane). Herein, distinction between the southern hemisphere and the northern hemisphere in the program may be simply implemented by a conditional expression for the latitude.

In FIG. 16, since it is assumed that t1 precedes t2, when the antenna is located in the northern hemisphere, the plane P1 is determined as the horizontal plane (X-Y plane). When the antenna is located in the southern hemisphere, the plane P2 is determined as the horizontal plane (X-Y plane). Further, the Z axis of the horizontal coordinate system may be calculated from the horizontal plane (X-Y plane).

For this geometric analysis, a variety of mathematical algorithms may be applied.

[Calculating of the Horizontal Coordinate System]

From the confirmed horizontal plane (X-Y plane), any one incidence vector, and the incidence angle information of the sunlight corresponding thereto, the true north direction (Y axis) of the horizontal coordinate system is calculated.

FIG. 17 is related to this and shows the projection vector T in which the incidence vector L_t1 at t1 is projected on the horizontal plane (X-Y plane) selected in the previous step. Using the Z axis as a rotation axis, the projection vector T is rotated backwards on the horizontal plane (X-Y plane) by the azimuth As_t1 of the sunlight, thereby calculating the Y axis. Further, from the determined Z axis and Y axis, the X axis perpendicular thereto is calculated, thereby confirming the horizontal coordinate system XYZ.

The details of calculating the projection vector, rotating the projection vector by the azimuth, and the like may be practically the same as those in the first embodiment described above.

Further, since the details of the calculating of the slope information at step p7, of the transmitting of the slope information to the management server at step p8 are practically the same as the corresponding steps of the first embodiment described above, a repeated description will be omitted.

The slope detection method according to the first embodiment of the present invention uses a gravity sensor and thus may be used in a movable apparatus.

In the meantime, the slope detection method according to the second embodiment does not use a gravity sensor and thus needs to be limited to an apparatus of which the installation location is fixed. However, there is an advantage in that the configuration therefor is cheaper than that of the detection device for the first embodiment.

The invention claimed is:

1. A slope detection method of base station antenna for mobile communication comprising:
    calculating a horizontal plane of a horizontal coordinate system through a gravity sensor;
    calculating, from light quantity data of sunlight measured by multiple optical sensors provided on a spherical surface in a manner that face different directions and measure a quantity of the sunlight, an incidence vector for an incidence direction of the sunlight on the basis of a local coordinate system;
    acquiring incidence angle information of the sunlight on the horizontal coordinate system by applying a time when the light quantity data is measured, latitude information, and longitude information to a sun path equation;
    confirming the horizontal coordinate system by calculating a true north direction (Y-axis direction) on the horizontal coordinate system through the horizontal plane (X-Y plane), the incidence vector, and the incidence angle information of the sunlight on the horizontal coordinate system; and
    calculating three-dimensional slope information including a tilt angle, an azimuth angle, and a roll angle of the antenna on the horizontal coordinate system by comparing the confirmed horizontal coordinate system with the local coordinate system,
    wherein in the calculating of the three-dimensional slope information, the roll angle of the antenna is corrected to be 0°, and then the tilt angle and the azimuth angle of the antenna on the horizontal coordinate system are calculated.

2. The slope detection method of claim 1, wherein the confirming of the horizontal coordinate system includes:
    calculating a projection vector by projecting the incidence vector onto the horizontal plane on the horizontal coordinate system;
    calculating, on the horizontal plane, the true north direction by reflecting an azimuth of the sunlight obtained through the incidence angle information of the sunlight on the horizontal coordinate system; and
    calculating the horizontal coordinate system by calculating an axis perpendicular to the horizontal plane and an axis perpendicular to the axis indicating the true north direction.

3. The slope detection method of claim 1, wherein the calculating of the incidence vector includes:
    collecting, from the multiple optical sensors, pieces of output information containing the light quantity data and an ID of each of the multiple optical sensors;
    sorting the pieces of the output information according to size of the light quantity data and selecting several pieces of the output information having higher values according to a preset criterion; and
    calculating the incidence direction of the sunlight through the selected pieces of the output information and converting the incidence direction to a unit vector so as to compute the incidence vector.

4. The slope detection method of claim 1, further comprising:
    after the calculating of the three-dimensional slope information, transmitting the three-dimensional slope information to a management server through communication.

* * * * *